United States Patent [19]

Barton

[11] 4,109,249

[45] Aug. 22, 1978

[54] SCANNING BEAM RECEIVER

[75] Inventor: Paul Barton, Bishop's Stortford, England

[73] Assignee: International Telephone and Telegraph Corporation, New York, N.Y.

[21] Appl. No.: 772,551

[22] Filed: Feb. 28, 1977

[51] Int. Cl.² .................. G01S 1/16; G01S 1/54
[52] U.S. Cl. ..................... 343/108 M; 343/106 R
[58] Field of Search .......... 343/106 R, 106 D, 108 M, 343/100 LE

[56] References Cited

U.S. PATENT DOCUMENTS

| 3,077,595 | 2/1963 | Frost | 343/118 |
| 3,349,401 | 10/1967 | Kennedy et al. | 343/106 R |
| 3,454,948 | 7/1969 | Reinagel | 343/106 R |
| 3,735,407 | 5/1973 | Meyer | 343/106 R |
| 4,050,074 | 9/1977 | Toman | 343/106 R |

Primary Examiner—Nelson Moskowitz
Assistant Examiner—Lawrence Goodwin
Attorney, Agent, or Firm—William T. O'Neil

[57] ABSTRACT

A scanning beam radio guidance system in which a ground beacon equipment transmits a single frequency collimated beam which sweeps a space sector of interest, and also transmits a frequency offset reference signal. An airborne remote receiver is responsive to both transmissions and includes post-detection signal processing means in the form of a time gate for inhibiting those parts of the main beam signal corresponding to angles outside the sector. A filter is also included for reducing the total spectrum contribution of the residual side-lobes of any out-of-sector beam signal.

4 Claims, 8 Drawing Figures

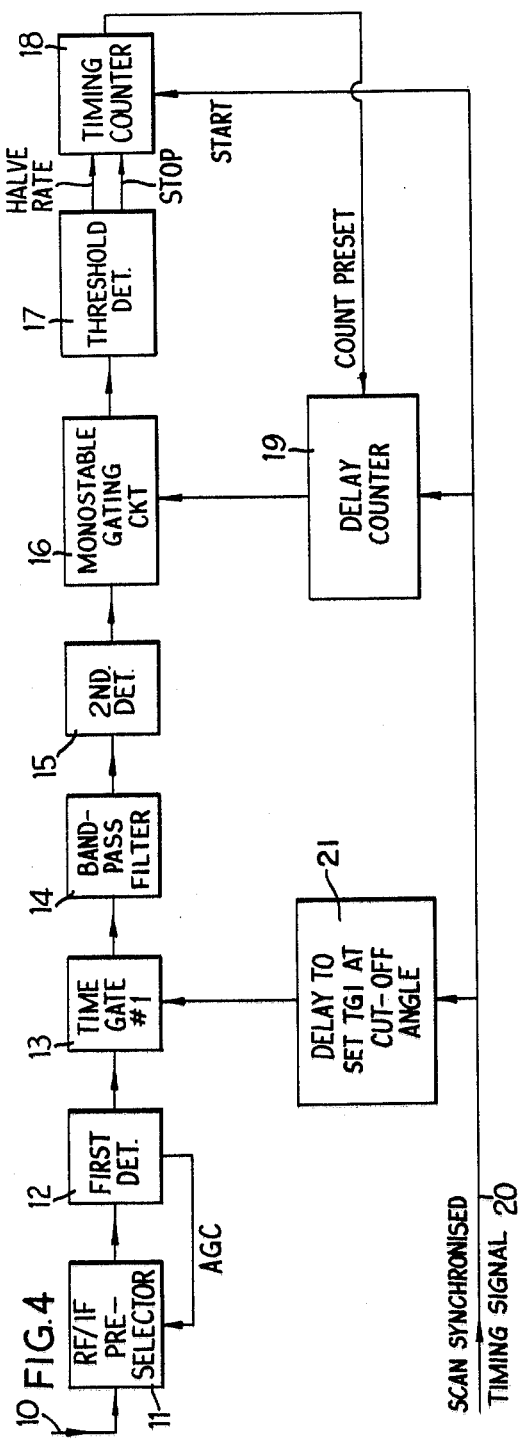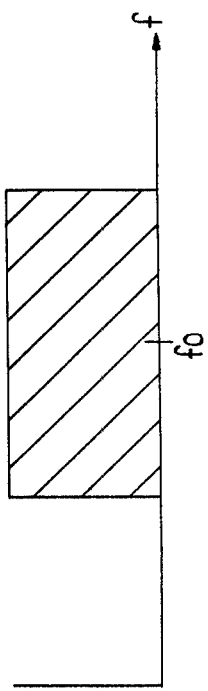

SCANNING BEAM RECEIVER

BACKGROUND OF THE INVENTION

1. Field of the Invention

The invention relates generally to electronic devices for air navigation and more particularly to radio guidance systems of the type providing air-derived angular information from reception of signals from a ground beacon system of the scanning beam type.

2. Description of the Prior Art

In the prior art, scanning beam radio navigation systems of the type to which the invention applies are known. In addition to the transmission of a single-frequency collimated beam which sweeps the sector of interest, there is either also transmitted a reference signal offset in frequency from that of the beam frequency, as described in copending U.S. patent application, C. W. Earp 156, Ser. No. 662,342, filed Mar. 1, 1976, now U.S. Pat. No. 4,053,892, or there is generated at the receiver a reference signal offset in frequency from that of the beam frequency described hereinafter with reference to FIG. 1 of the accompanying drawings.

The provision of such a reference signal permits a beat between the two signals (beam and reference) to be detected in the receiver to produce a signal of average frequency which is equal to the offset frequency $f_o$. The instantaneous phase of the beat signal at any point in time depends on the phase relationship between the reference signal and the beam signal, and provides a detected signal which is of a coherent nature.

SUMMARY

It may be said to be the general object of the present invention to utilize the aforementioned coherence in post-detector signal processing in the airborne receiver, particularly to achieve high accuracy at very low angles in an elevation system.

According to the invention, there is provided a receiver arrangement for a radio guidance scanning beam system of the type wherein there is transmitted a single frequency collimated beam sweeping a sector of interest and either there is transmission over the whole of the sector or there is pre-detector generation at the receiver of a reference signal of a frequency offset (by a predetermined amount $f_o$) from the beam frequency, said receiver including a post-detector signal processing means comprising, a time gate for inhibiting those parts of the main beam signal corresponding to angles outside the sector and, coupled to the output from said time gate, a filter for significantly reducing the total spectrum contribution of the residual side-lobes of any out-of-sector beam signal.

BRIEF DESCRIPTION OF THE DRAWINGS

FIG. 4 is a block diagram of the stages of a receiver embodying the invention.

FIGS. 5a, 5b, 6 and 7 show signal waveforms and frequency spectra at different points in the receiver of FIG. 3 and under different conditions.

DESCRIPTION OF THE PREFERRED EMBODIMENT

The so-called reference signal referred to herein may be generated as contemplated in the aforementioned U.S. patent application Ser. No. 662,342, now U.S. Pat. No. 4,053,892, or may be developed at the receiver in accordance with the scheme shown in FIG. 1.

Figure 1:
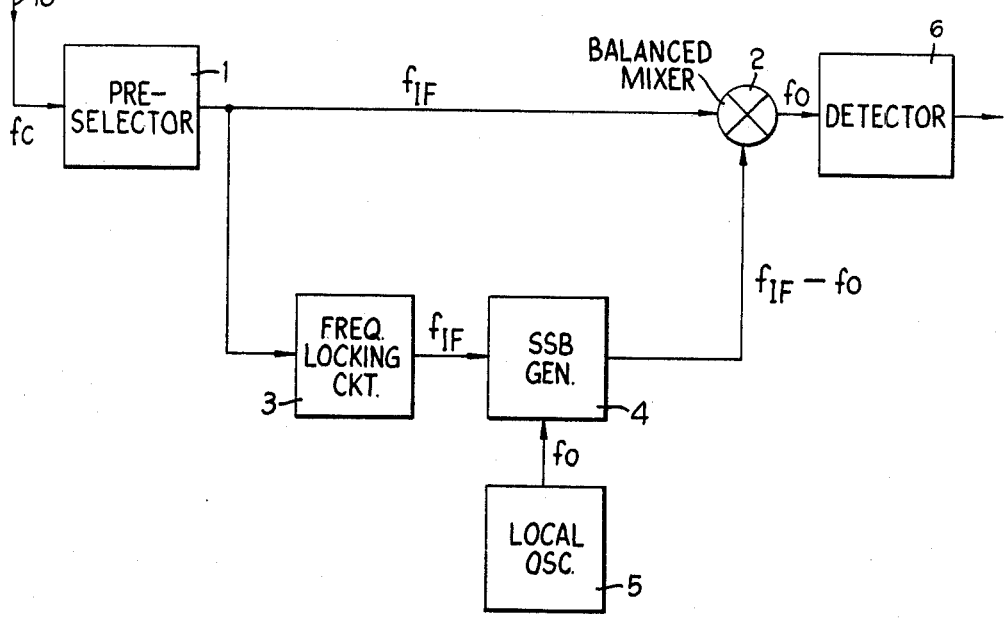
FIG. 1 is a schematic block diagram showing generation, at the receiving station, of a reference signal.

In FIG. 1, a receiver having a preselection stage 1 (RF followed by IF) is illustrated. The beam signal is received as an input at 10, at frequency $f_c$, typically 1 GH$_z$. The output $f_{IF}$ is effectively the beam signal in the IF domain, typically 10 MH$_z$, and has the same amplitude and phase information carried through preselector 1. An input of a balanced mixer 2 and also a frequency locking circuit 2 receive this signal $f_{IF}$. The locking circuit output 3 provides a continuous output at frequency $f_{IF}$, and that signal forms an input to a single sideband generator (SSB) 4. The other input to 4 is provided by local oscillator 5 at frequency $f_o$, typically 20 KH$_z$ or 30 KH$_z$.

The SSB 4 provides the second input to the balanced mixer 2 at $f_{IF} - f_o$. The output of mixer 2 is therefore at the local oscillator frequency $f_o$. Output 7 from detector 6 can then provide a signal to subsequent processing stages. This description of FIG. 1 is based on prior art, and is provided for an understanding of one technique for development of the reference signal (offset) $f_o$.

Figure 2:
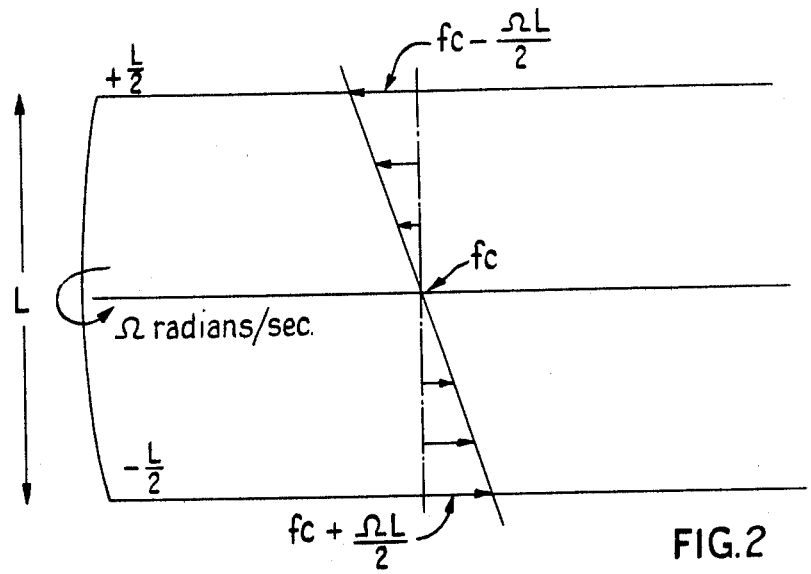
FIG. 2 is a graphic functional representation of a scanning beam transmitting antenna in operation in an elevation system according to the invention.

Referring now to FIG. 2, a mechanically rotated "dish" antenna of transmitting aperture L wavelengths (at the beam frequency $f_c$) is depicted, scanning vertically over its service sector at an angular velocity of $\Omega$ radians/sec. A dish antenna has been shown for convenience, but it will be understood that the collimated beam signal thereby produced could equally be transmitted by a phased array antenna, wherein there is electronic "rotation" of the antenna which is analogous to the mechanically rotated dish for present purposes.

Assuming that the direction of rotation, i.e. the direction of scan, is counterclockwise as shown, there are positive Doppler shifts in the beam frequency on the advancing radius from the center of the aperture, and negative Doppler shifts on the receding radius. The absolute values of these Doppler shifts in the beam frequency on the advancing radius from the center of the aperture, and negative Doppler shifts on the receding radius. The absolute values of these Doppler shifts are directly proportional to the distnce of the transmitting point of the antenna from aperture center.

Figure 3:
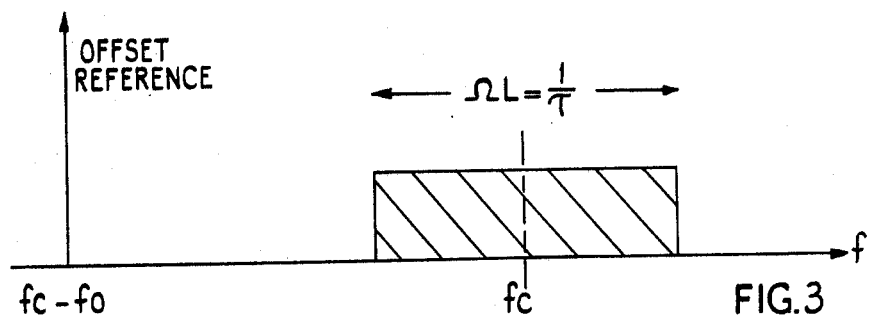
FIG. 3 shows the frequency spectra of the received beam signal and offset reference signal.

With a beam shape of sin $x/x$ in form, the beam signal as received at a remote receiver in the sector has a rectangular frequency spectrum of total width $\Omega$ L = $1/\tau$, where $\tau$ is the "dwell time" of the beam, see FIG. 3. Any point across this spectrum corresponds directly with a point along the array aperture. Also received, or generated at the receiver, is an offset frequency $f_c - f_o$. The actual apparatus for generating this offset involves mixing in the manner described in connection with FIG. 1, for example.

Typically, the dwell times for a scanning beam system are of the order of 100 to 1,000 $\mu$ secs. Taking 200 $\mu$ secs. as an example, the spectral width of the scanned beam signal will be 5 kHz. To avoid harmonic problems, the offset of the reference signal should exceed 7.5 kHz. Further, there is practical convenience in having many cycles inside the main beam to assist final detection and timing of the beam (to be described later), so that for the case being considered, an offset frequency $f_o$ of 20 kHz is a convenient choice.

FIG. 4 shows receiver stages for processing the received beam signal and the reference signal, the reference signal in this instance being transmitted with the beam, both signals being extant at input 10. For a receiver generating its own reference frequency, an additional stage is required between the RF/IF amplifier 11 and the first detector 12.

The receiver RF and IF stages 11, are made as linear as possible, and AGC is provided in the normal way, with time constants substantially exceeding the sector scan time.

Between the first detector 12 and second detector 15, time gate 13 and a bandpass filter 14 centered on $f_o$, are connected in series.

The first detector 12 operates on the IF components to yield a sub-carrier signal centered at $f_o$. FIGS. 5a and 5b show the best waveform and the best spectrum respectively.

It is assumed at this stage of the description that timing signals synchronized to the transmitter's scan movements are available directly for subsequent processing. Such signals may be separately derived from ground transmissions and applied to 19 and 21, as shown in FIG. 4.

The coherent signal output from the first detector 12 is applied to the time gate 13 which is controlled by the synchronizing signals on 20 (enabled at a predetermined time after the synchronized timing signal occurs). The function of the time gate 13 is to inhibit the passage of those parts of the received signal which correspond to angles beginning a fraction of a beam width below the desired minimum coverage angle and on down therefrom. Hence, time gate 13 is enabled only at and above the required minimum angle.

In lieu of signal 20 being received from the ground, there are advantages in having the beam "shut-off" synthesized at the receiver, i.e. in the air, for instance to provide guidance below the array phase center at close range.

The scan is assumed to be a complete entity from which angle measurement can be made. Consideration of practical formats, e.g. to-and-fro scanning, only involve changes in the implementation details.

The time gate 13 is therefore taken to be enabled above the minimum point already described, to the limit of the sector coverage.

The coverage should be as wide as possible for maximizing the effect of the total process.

Figure 6:
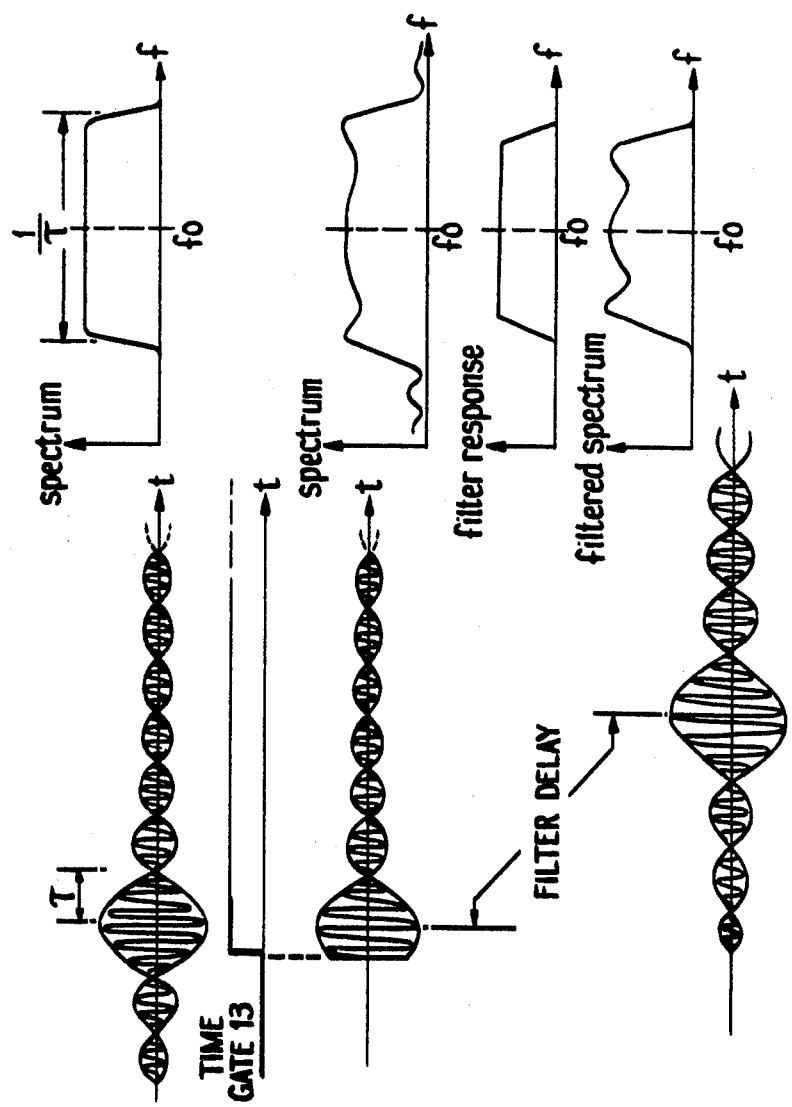
Figure 7:
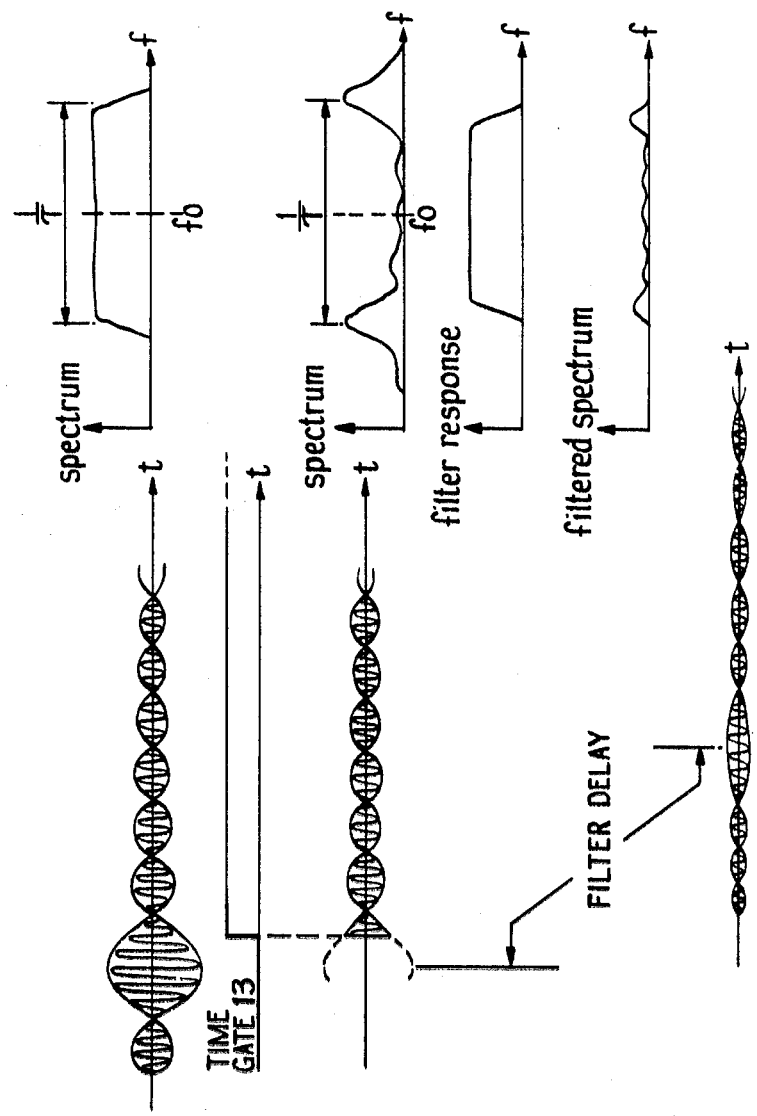

The function of the time gate 13 is best illustrated by considering separately the spectra for two received beam positions with their side lobes, one with its main-beam inside the timegate 13, FIG. 6, and one (representing a negative angle reflection plus side lobes) with its main beam inhibited by the time gate, FIG. 7.

In the first case, with an in-sector beam, the spectrum occupancy is distributed evenly across the expected bandwidth. In the second case, with an out-of-sector beam, the majority of the spectrum is confined to the edges of the bandwidth.

Thus the filter 14 which has a bandwidth $f_o \pm k/\tau$ such as to reject or attenuate the edges of the band while passing the majority of the central region will only slightly reduce the total signal spectrum of the in-sector beam, but will greatly reduce the total spectrum contribution of the residual side-lobes of the out-of-sector beam. The time waveform which finally emerges from the filter 14 corresponding to the filtered in-sector beam is therefore similar in form to that applied to the filter. The main beam is slightly broadened corresponding to the restriction of information bandwidth, and there is a relatively large delay term brought about by the filter characteristic. That delay, however, can be calibrated out.

The waveform emerging from the filter (FIG. 7) for the time-gated and filtered out-of-sector beam shows the residual side-lobe level is considerably reduced by the filter action, resulting in a significantly improved measurement accuracy. The filter acts as a storage device so that the entire received signal from a sweep of the sector can be used for destroying the coherence of the side-lobes of the unwanted signal.

The final stages of signal processing involve surrounding the desired main beam with a tracking time gate so that unwanted above-course reflections do not corrupt the measurement process.

The synchronized timing signals on 20 are therefore used to start a counter 19 which, when it reaches a present count, enables 16 which is a monostable circuit, the time constant of which is equal to the dwell time of the beam. The preset count in the counter is determined by measurement of the beam center position during the previous scan period and is therefore capable of revision if there is a change in the position of the beam center between successive scans.

This may be referred to as angle gating, and a corresponding signal 20 derived by angle tracking techniques is shown applied to the second time gate 16 for this purpose.

Beyond stage 16, there is final detection of the sub-carrier at detector 15, with determination of beam center by means of threshold detector 17 and timing counter 18 to establish the relative position of the beam center with respect to a time reference introduced at 21. This time reference is either received from the ground beacon, or can be a running value produced from the separate angle tracking function aforementioned.

To operate timing counter 18, a further (delay) counter 19 is started by the synchronized timing signal 20 and this counter runs at a first fast count rate until the threshold detector 17 detects that the main beam crosses the threshold for the first time. The count rate is then halved until the main beam crosses the threshold for the second time, when the count is stopped. The resulting count thus indicates the position of the center of the main beam.

It is to be understood that the foregoing description of specific examples of this invention is made by way of example only and is not to be considered as a limitation on its scope.

What is claimed is:

1. In an air navigation system in which a ground based equipment scans a colimated beam of radio frequency energy over a predetermined sector of space in at least one angular coordinate and also transmits a phase-coherent reference signal offset from the frequency of said beam and a timing signal identifying a corresponding predetemined instantaneous angle of said beam scan and including airborne receiving apparatus for determining a navigational angle within said angular coordinate with respect to said ground station in accordance with the elapsed time between reception of said timing signal and said scanning beam, comprising:

first means comprising a receiver responsive to said phase-coherent, frequency-offset reference signal and to signals of said beam received as said beam scans across the location of said airborne receiving apparatus for coherently detecting said beam signals to produce a first detected signal;

second means within said airborne receiving apparatus responsive to said timing signal for inhibiting the output of said first means for angles of said scanning beam outside a predetermined limit angle;

third means comprising a bandpass filter responsive to said second means for suppressing that portion of the frequency spectrum generated within said first means corresponding to Doppler Components earlier and later in time than that received from the substantial center of said beam, as said beam scans across the location of said airborne receiving apparatus;

and fourth means within said airborne receiving apparatus comprising means for generating a tracking gate surrounding at least the central portion of said beam and for determining the center thereof.

2. Apparatus according to claim 1 in which the bandwidth of said filter of said third means is $f_o \pm K/\tau$ where $f_o$ is the frequency of said offset frequency reference signal, $\tau$ is the dwell time of said beam as it scans across said location of said airborne receiving apparatus, and K is a constant.

3. Apparatus according to claim 1 in which said first and second means outputs are in the IF domain, and in which said fourth means includes a second detector responsive to said third means to reduce the frequency domain of the output signals thereof to the video frequency domain.

4. Apparatus according to claim 2 in which said first and second means outputs are in the IF domain, and in which said fourth means includes a second detector responsive to said third means to reduce the frequency domain of the output signals thereof to the video frequency domain.

* * * * *